United States Patent
Hachtmann

[11] 3,850,538
[45] Nov. 26, 1974

[54] CLAMP COUPLING
[76] Inventor: Otto Hachtmann, Alemannstrasse 21, 300 Hanover, Germany
[22] Filed: Jan. 2, 1973
[21] Appl. No.: 320,152

[52] U.S. Cl. ............... 403/350, 192/44, 242/46.4
[51] Int. Cl. ............................................. B65h 75/30
[58] Field of Search ........... 403/112, 117, 343, 350; 192/44, 45; 242/46.4

[56] References Cited
UNITED STATES PATENTS

| | | | |
|---|---|---|---|
| 1,451,111 | 4/1923 | Reedy | 403/351 X |
| 2,411,739 | 11/1946 | Luehrs | 192/44 U X |
| 2,526,565 | 10/1950 | Kennard | 403/350 X |
| 2,722,149 | 11/1955 | Henley | 192/44 X |
| 3,006,565 | 10/1961 | Pelletier | 242/46.4 |
| 3,403,502 | 10/1968 | Caminada | 242/46.4 X |
| 3,606,187 | 9/1971 | Hahn | 242/46.4 X |

Primary Examiner—Werner H. Schroeder
Attorney, Agent, or Firm—Richards & Geier

[57] ABSTRACT

In order to couple a shaft centrally to a collet of optional material clamping bodies capable to be urged radially outward are elastically mounted on a clamp coupling. The clamping bodies are connected by collars to a jacket providing an enclosure of adequate play for a shaft and a spider. The clamping bodies may have sleeve-like prolongations which extend in axial direction so as to provide for a space for the movement of the flexible shafts.

7 Claims, 6 Drawing Figures

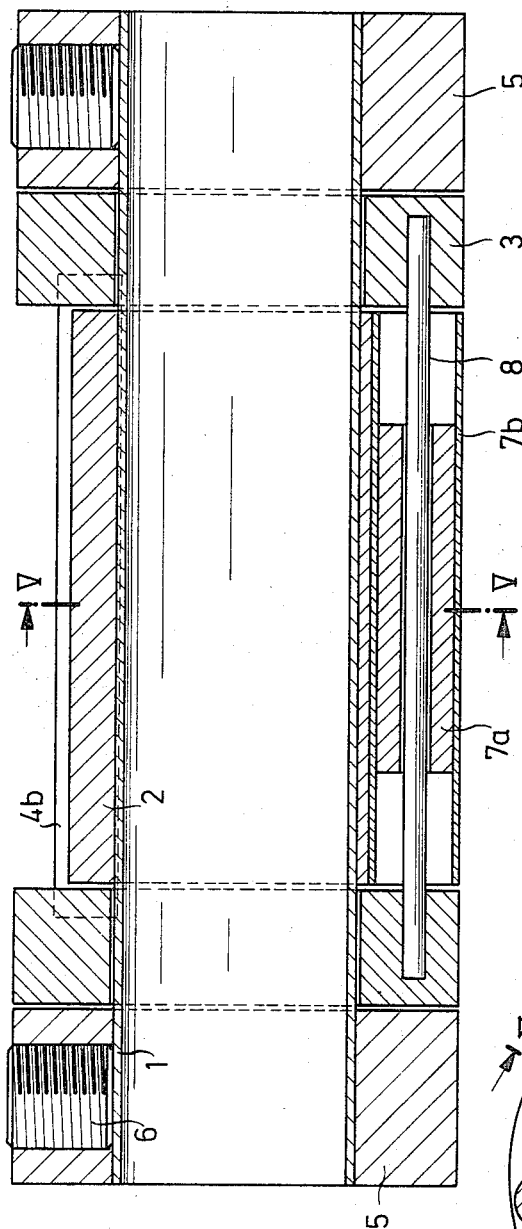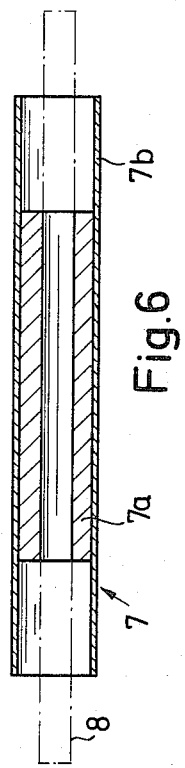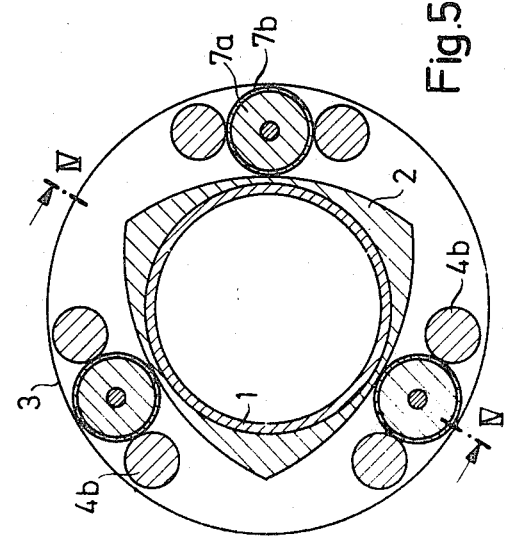

CLAMP COUPLING

DESCRIPTION OF THE INVENTION

This invention relates to a free-wheeling or an overrunning type clamp coupling provided with a clamp body to centrally couple a shaft to a sleeve or collet of optional material surrounding the shaft, which clamp body can be urged outwardly in radial direction by means of a spider or star wheel.

A clamp coupling of the aforementioned type constitutes an overrunning or free-wheeling clamping device comprising spherical or roller-type clamping bodies capable of movement alongside of the spider surfaces and, at the same time, radially displaceable in outward direction. The clamping bodies are wedged between the spider and the inside wall of the collet to be clamped so as to establish a firm connection between the machine shaft supporting the spider and the collet or sleeve.

Since couplings and clamping devices of this type are lacking a free-wheeling jacket retaining the clamping bodies at the spider it becomes necessary to make use of a special bearing application in order to hold the clamping bodies at the spider.

In this way, clamp couplings have become known in prior art wherein the cylindrically shaped clamping bodies are held in guide rings provided with radial slots. For housing the clamping bodies there have been provided in other designs cylindrical jackets provided with slots preventing the clamping bodies from completely leaving the coupling or falling out therefrom. In all such couplings the clamping bodies and/or their axes are movably housed to allow for the displacement, occuring during clamping action, alongside of the clamping surfaces of the spider and, additionally, in radial direction. Radial mobility is, however, confined in clamp couplings of this type to less than half the diameter of the clamping body. In the art it is known, furthermore, that such clamp couplings have their clamping bodies engage only from one end the interior of a sleeve or collet to be mounted. It is, hence, not the case that the entire collet is grasped by the clamping bodies of the couplings, not constituting any disadvantage when collets of rigid material such as steel are used. In this context it is of little significance when the clamping bodies are endowed only with relatively restricted radial mobility and can step out with their clamping surfaces only slightly over the outer periphery of the collets or discs which, respectively, are supporting and guiding them.

Using a flexible material, e.g., cardboard, for the collets to be mounted is only disadvantageous when torque is initially exerted via the end of the clamping bodies from the clamping shaft of the drive means to said collets. The clamping elements may not have any length whatsoever without exerting on their guides an excessive amount of strain. Moreover, flexible material requires a large degree of radial mobility of the clamping bodies, in part even far beyond the outer periphery of the guide elements or discs. In prior art embodiments this was not possible without running the risk to have the clamping bodies drop out from their seats.

In order to obviate this inconvenience and disadvantage there has been developed a clamp coupling using clamping bodies resiliently connected to the spider. For this purpose elastic connection elements e.g., flexible shafts may be used which are connected, directly or indirectly, to the spider. Clamping bodies of such couplings may leave their original position to the extent of their full diameter and move radially outward. Moreover, flexible collets, e.g., made of cardboard, may be mounted centrally in an adequate and unobjectionable manner. Clamping force is transmitted uniformly to the entire length of the collet, and twisting due to onesided clamping is no longer possible. If such clamping devices are employed erroneously with excessively large collets — not in keeping with its standard — there might arise the disadvantageous and even dangerous effect that the three-dimensional movement of the flexible shaft is being exceeded so that on account of the excessive expansion of the clamping elements, the flexible shaft may be adversely affected and damaged.

It is, therefore, the object of the present invention to provide a clamp coupling with elastically mounted clamping bodies in such manner that faulty gripping of the coupling with a collet surrounding said coupling will not lead to an excessive three-dimensional motion of the connecting elements supporting the clamping bodies.

This is achieved by the provision that the clamping bodies are connected to a body surrounding the shaft and the spider with adequate play. It is assured that excessive three-dimensional twisting of the flexible connecting members connecting the clamping bodies to the jacket may not arise. If excessive torsioning of the jacket towards the spider takes place, the clamping bodies can slide automatically into the next normal position and are thus protected from damage to their shafts.

According to another feature of the invention the clamping bodies are to grip via flexible shafts into the set collars supporting the jacket and enclosing the shaft with adequate clearance or play. Said collars may form with the jacket an integral part, they can however also be constituted as separate units. In order to prevent the flexible shafts from contacting the edges of the jacket slots and from being exposed, in the course of time, to adverse effects due to friction and shearing it is particularly advantageous to provide sleeve-like prolongations in the axial direction on the faces of the clamping bodies, which extend up to the set collars, so as to provide sufficient space for the displacement of the flexible shafts. In this way the radially directed movement or displacement of the flexible shafts can no longer be impeded, and shearing is avoided since there exists now within the clamping bodies at their respective ends a space of travel for the radial movement of the flexible shafts.

In an additional aspect of the invention the clamping bodies comprise each a cylinder having a bore corresponding to the diameter of the flexible shafts. The ends of which bore are dimensioned to correspond to the space provided for the movement of the flexible shafts. The clamping bodies may also be formed of two concentric cylinders arranged the one within the other with the length of the outer cylinder corresponding to the distance between the set collars while the inner cylinder is of a somewhat shorter dimension on both its ends. Prolonging the clamping bodies towards both sides up to the set collars has the additional advantage of allowing the clamping effect to be uniformly transmitted over a still longer length to the collet to be coupled to the shaft.

It has turned out to be of particular advantage to interconnect the rotatable set collars by means of bars between which the clamping bodies are arranged and guided. Likewise, no shearing occurs here since the flexible shafts, when moving can no longer be urged towards or pushed against the edges of the slots of the jacket having been used up to now. Discarding the jacket removes the possibility that dust may be deposited, which would otherwise adversely affect its availability for service.

The foregoing and additional objects and advantages of the invention will become more apparent as the following detailed description is read in conjunction with the accompanying drawing.

FIG. 4 is a longitudinal section along IV—IV of FIG. 5 of a coupling having clamping bodies with sleeve-like prolongations extending up to the set collars, FIG. 5 is a cross section at location V—V of FIG. 4, and FIG. 6 is an individual clamping body comprised of two concentric parts.

Identical parts have been given the same reference numerals in all figures.

Figure 1:
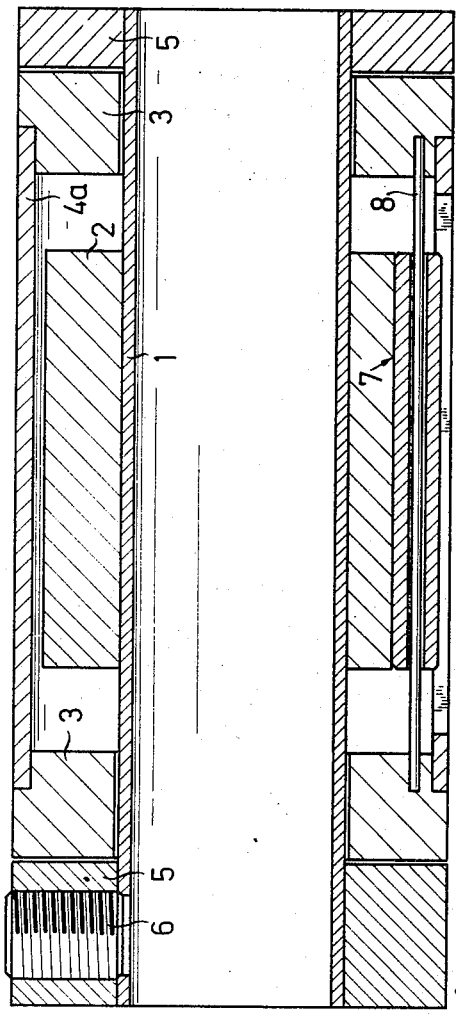
FIG. 1 is a longitudinal section I—I through a coupling according to FIG. 3.

A hollow shaft 1 is mounted upon a driving shaft which is not illustrated. The shaft 1 carries a star wheel 2, which is firmly fixed thereon. A hollow collar device for clamping bodies is rotatably mounted upon the shaft 1. The collar device, including two set collars or rings 3, which carry a cover 4a, are firmly joined to each other by this cover. Clamping bodies or members 7 are substantially cylindrical or curved in shape, and are mounted upon a bendable and elastic axle 8. The ends of the axle 8 extend into bores of the rings 3. The cover 4a has slits 9, by means of which the clamping members 7 can be pressed outwardly by the star wheel 2. Closure rings 5 are firmly fixed upon the shaft 1 on both sides of the collar device. Thus, the location of the collar device is fixed upon the shaft 1 and relatively to the star wheel 2. A screw with inner six sides is used to fix the closure rings 5 upon the shaft 1 and to firmly connect the shaft 1 with the driving shaft, which is not illustrated.

Figure 2:
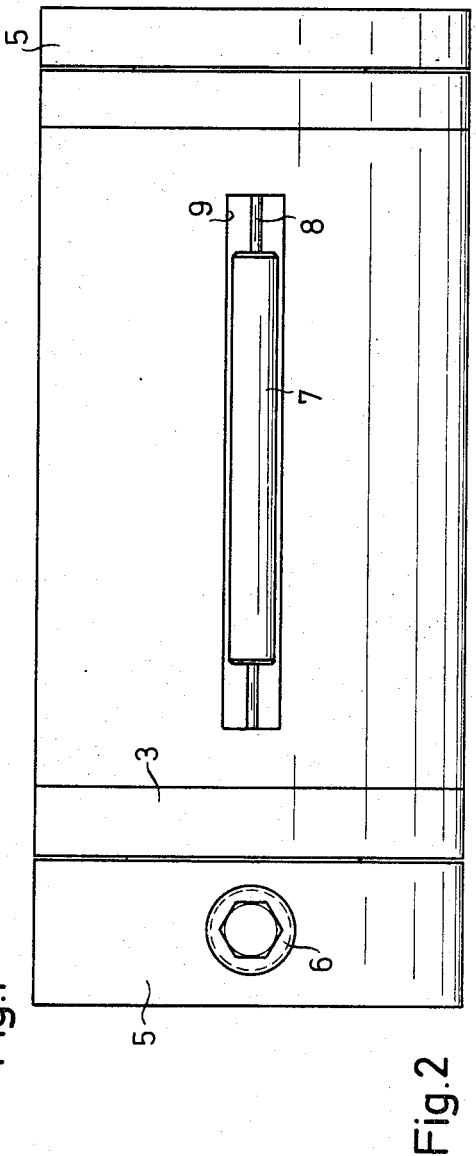
FIG. 2 is a plan view.
Figure 3:
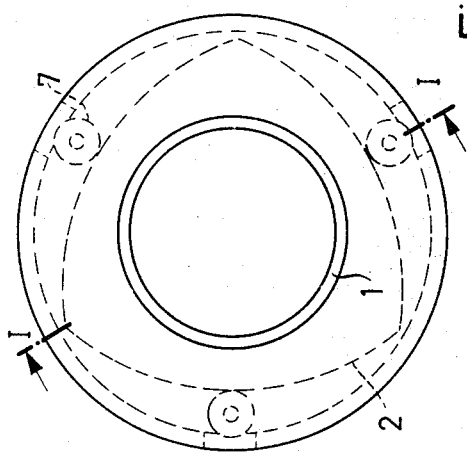
FIG. 3 is a front view of the coupling according to FIG. 1.

FIGS. 4 to 6 show alternate constructions. In these constructions, the clamping device consists of rings 3 with rods 4b firmly interconnecting the rings 3. The rods 4b are so arranged that a guide is provided for the clamping members 7 in a manner similar to that of the slits 9 of FIG. 2. The clamping members shown in FIGS. 4 to 6 consist of hollow cylinders or rollers 7a, and are covered by outer covers 7b. The covers 7b extend beyond the ends of the rollers 7a close to the rings 3. This provides a free space for the curving of the bendable and flexible shafts or axles 8.

A roller, for example, a paper-winding roller which, for that purpose, is rotated by the driving shaft (not shown), is simply mounted on the clamping coupling. The clamping connection between the winding roller and the clamping coupling can be produced by braking this roller when the driving shaft begins to rotate. The rotation of the driving shaft and the shaft 1 firmly mounted thereon causes a rotation of the star wheel 2 fixed thereon relatively to the collar device with the clamping members 7. The star wheel passes the clamping members 7 radially outwardly through the slits 9 (FIG. 2) or through the rods 4b arranged in pairs (FIG. 4), so that a firm clamping seat is produced between the winding roller, the clamping coupling and thus with the driving shaft (not shown). Since there is usually a light contact between the clamping members 7 held in the collar device and the winding roller, the clamping seat is produced substantially automatically.

Rigging the coupling according to the invention between a machine shaft and a collet is effected automatically by way of the divergent movement of these elements during the run of the machine, with the jacket 4a and/or the cage formed of the set collars 3 and bars 4b being twisted, together with the clamping bodies, flexibly connected to the set collars, towards the spider 2 securely connected to the terminal collars 5 in such a manner that the clamping bodies run alongside on the surfaces of the spider and are urged radially outward until a clamp connection is established with the collet to be mounted.

What I claim is:

1. A clamp coupling, comprising a hollow shaft, a star wheel fixed upon said shaft, a hollow collar device enclosing said star wheel and rotatably mounted upon said wheel, round clamping members, bendable and elastic axles extending through said collar device and carrying said clamping members, said collar device having outer openings through which said star wheel can push said clamping members and means holding the ends of said axles, whereby the radial distance of the ends of said axles from the longitudinal axis of the coupling is unvariable, and closure rings fixed upon said hollow shaft upon opposite sides of said collar device.

2. A clamp coupling according to claim 1, wherein said collar device comprises two spaced rings rotatably mounted upon said hollow shaft and a cover carried by the last-mentioned rings, said cover having said outer openings.

3. A clamp coupling according to claim 1, wherein said collar device comprises two spaced rings rotatably mounted upon said hollow shaft, and rods connecting the last-mentioned rings, said rods extending on both sides of each clamping member.

4. An improved clamp coupling according to claim 1 wherein the faces of the clamping members have sleeve-like prolongations leading up to the set collars, which prolongations extend in axial direction so as to provide for a space of travel for the movement of the flexible shafts.

5. An improved clamp coupling according to claim 4 wherein the clamping members each comprise a cylinder having a bore corresponding to the diameter of the flexible shafts, the ends of which bore being enlarged so as to correspond to the space of travel of the flexible shafts.

6. An improved clamp coupling according to claim 4 wherein the clamping members are comprised of two concentric cylinders, residing the one within the other, with the length of the outer cylinder corresponding to the distance between the set collars and the inner cylinder being shorter on both of its sides.

7. An improved clamp coupling according to claim 4 wherein the set collars are connected with one another by means of connecting rods forming a cage, between which rods the clamping members are arranged and guided.

* * * * *